US008559069B2

(12) United States Patent
Ho et al.

(10) Patent No.: US 8,559,069 B2
(45) Date of Patent: Oct. 15, 2013

(54) SHEET-FED SCANNER WITH LINKING MEMBER

(75) Inventors: Shu-Wei Ho, Taichung County (TW); Ching-Jung Tu, Hsinchu (TW)

(73) Assignee: Avision Inc. (TW)

( * ) Notice: Subject to any disclaimer, the term of this patent is extended or adjusted under 35 U.S.C. 154(b) by 172 days.

(21) Appl. No.: 13/240,123

(22) Filed: Sep. 22, 2011

(65) Prior Publication Data

US 2012/0081764 A1    Apr. 5, 2012

(30) Foreign Application Priority Data

Oct. 1, 2010   (TW) .............................. 99133506 A (51) Int. Cl.
*H04N 1/04*   (2006.01)

(52) U.S. Cl.
USPC ........................... 358/474; 358/475; 358/501

(58) Field of Classification Search
USPC .......... 348/474, 498, 471, 473; 358/474, 498, 358/471, 473
See application file for complete search history.

(56) References Cited

U.S. PATENT DOCUMENTS

| | | | | |
|---|---|---|---|---|
| 5,301,243 A * | 4/1994 | Olschafskie et al. | .......... | 382/314 |
| 5,841,553 A * | 11/1998 | Neukermans | ................. | 358/494 |
| 5,865,431 A * | 2/1999 | Ma | ................................ | 271/3.14 |
| 6,178,012 B1 * | 1/2001 | Larkin et al. | ................... | 358/474 |
| 6,381,020 B1 * | 4/2002 | Tsukamoto et al. | .......... | 356/445 |
| 6,441,928 B1 * | 8/2002 | Tuli et al. | ....................... | 358/473 |
| 6,459,506 B1 * | 10/2002 | Hu et al. | ........................ | 358/473 |
| 6,704,124 B2 * | 3/2004 | Hu et al. | ........................ | 358/473 |
| 6,791,720 B1 * | 9/2004 | Hsieh | .............................. | 358/473 |
| 7,002,712 B2 * | 2/2006 | Barker et al. | ................... | 358/473 |
| 7,362,477 B2 * | 4/2008 | Ishikawa et al. | ............... | 358/473 |
| 7,679,792 B2 * | 3/2010 | Marshall et al. | ............... | 358/474 |
| 8,203,785 B2 * | 6/2012 | Kindler et al. | ................. | 359/443 |
| 8,270,043 B2 * | 9/2012 | Zhu et al. | ....................... | 358/474 |
| 8,289,591 B2 * | 10/2012 | Zhu | ................................ | 358/498 |
| 8,373,912 B2 * | 2/2013 | Pandipati | ....................... | 358/474 |

* cited by examiner

*Primary Examiner* — Negussie Worku (57) ABSTRACT

A sheet-fed scanner includes a housing, a scan assembly carrier, a scan assembly and a bent linking member. The scan assembly carrier is movably disposed in the housing. The scan assembly mounted in the scan assembly carrier scans a side of an original sheet in a main scan direction. The bent linking member disposed between the housing and the scan assembly carrier includes a first section and a second section. The first section extends transversally in relation to the main scan direction and interconnecting two opposed ends of the scan assembly carrier. The second section, connected with the first section, forms an angle with the first section. As one of two opposed ends of the scan assembly carrier is pushed towards the housing in a direction, the bent linking member urges the other end to move in the same direction.

11 Claims, 13 Drawing Sheets

SHEET-FED SCANNER WITH LINKING MEMBER

This application claims priority of No. 099133506 filed in Taiwan R.O.C. on Oct. 1, 2010 under 35 USC 119, the entire content of which is hereby incorporated by reference.

BACKGROUND OF THE INVENTION

1. Field of the Invention

The present invention relates to a sheet-fed scanner having a bent linking member, and more particularly to a sheet-fed scanner using a bent linking member to distribute an exerted force and to improve the scan image quality.

2. Related Art

When a conventional sheet-fed scanner scans an original sheet, especially a card, with its suspended scan assembly, the original sheet lifts up the suspended scan assembly by a stroke determined by the thickness of the original sheet. For example, when a cardboard, such as a credit card, enters the sheet passageway and contacts the rollers at the sheet-input end of the scan assembly, the scan assembly is inclined with its front-end lifted up to accommodate the cardboard. When the rollers at both of the sheet-input end and the sheet-output end contact the cardboard, the scan assembly restores the horizontal state. When the cardboard leaves the nip between the rollers at the sheet-input end, the scan assembly is inclined again, where at this time its rear-end is lifted up by the cardboard, since the cardboard is still in contact with the rollers at the sheet-output end. The motion of the scan assembly from one inclined state to the horizontal state, and then to another inclined state may be referred to as the seesaw motion, which causes the seesaw effect.

When the scan assembly is using, for example, a contact type image sensor (CIS), its depth of field is short and its scan precision is low. The seesaw effect will seriously affect the quality of the image outputted from the CIS. In addition, the thicker the original sheet is, the greater is the image shock which deteriorates the scan image quality.

SUMMARY OF THE INVENTION

Accordingly, the present invention has been proposed to solve the problems of the prior art, and it is an object of the present invention to provide a sheet-fed scanner using a bent linking member to distribute the exerted force on the scan assembly and to improve the scan image quality.

To achieve the above-identified object, the present invention provides a sheet-fed scanner including a housing, a scan assembly carrier, a scan assembly and a bent linking member. The scan assembly carrier is movably disposed in the housing. The scan assembly, mounted in the scan assembly carrier, scans a side of an original sheet in a main scan direction. The bent linking member is disposed between the housing and the scan assembly carrier and includes a first section and a second section. The first section extends transversally in relation to the main scan direction and interconnects two opposed ends of the scan assembly carrier. The second section, connected with the first section, forms an angle with the first section. As one of the two opposed ends of the scan assembly carrier is pushed towards the housing in a direction, the bent linking member urges the other end of the two opposed ends to move in the same direction.

With the sheet-fed scanner mentioned hereinabove, the force exerted on the scan assembly and pushing it towards the housing can be distributed more evenly and the scan image quality can be improved.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1A:
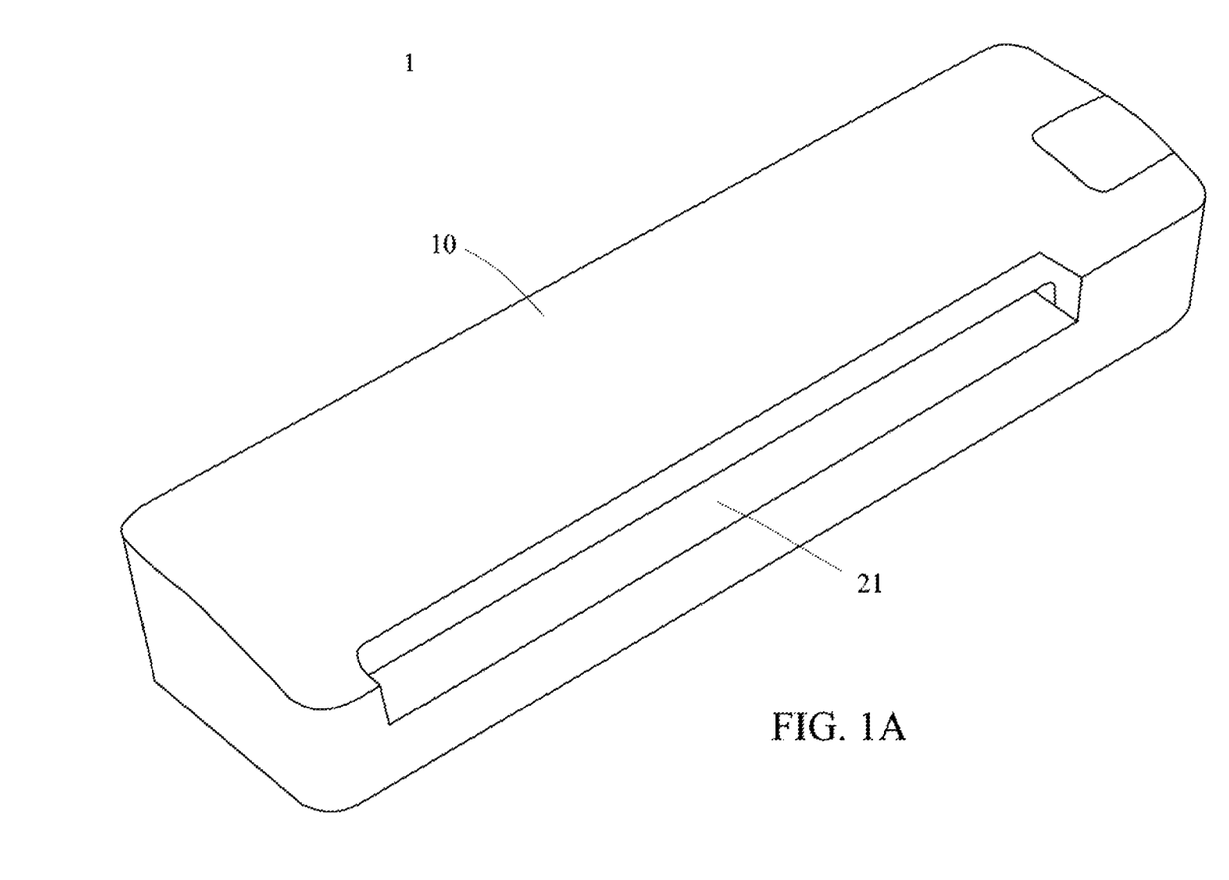
FIG. 1A is a pictorial view of a sheet-fed scanner according to a preferred embodiment of the present invention.
Figure 1B:
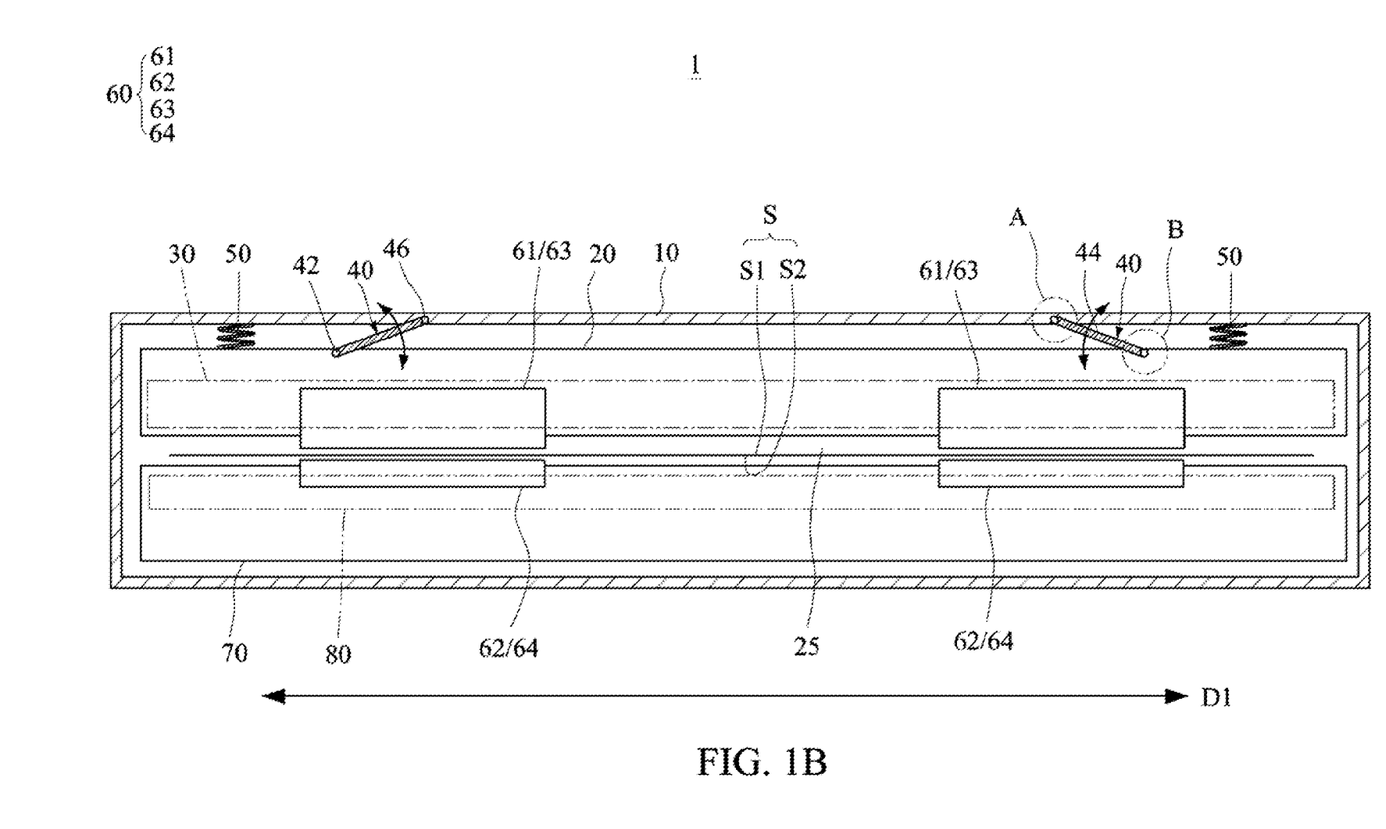
FIGS. 1B and 2 are respectively front and side views of the sheet-fed scanner according to the preferred embodiment of the present invention.
Figure 2:
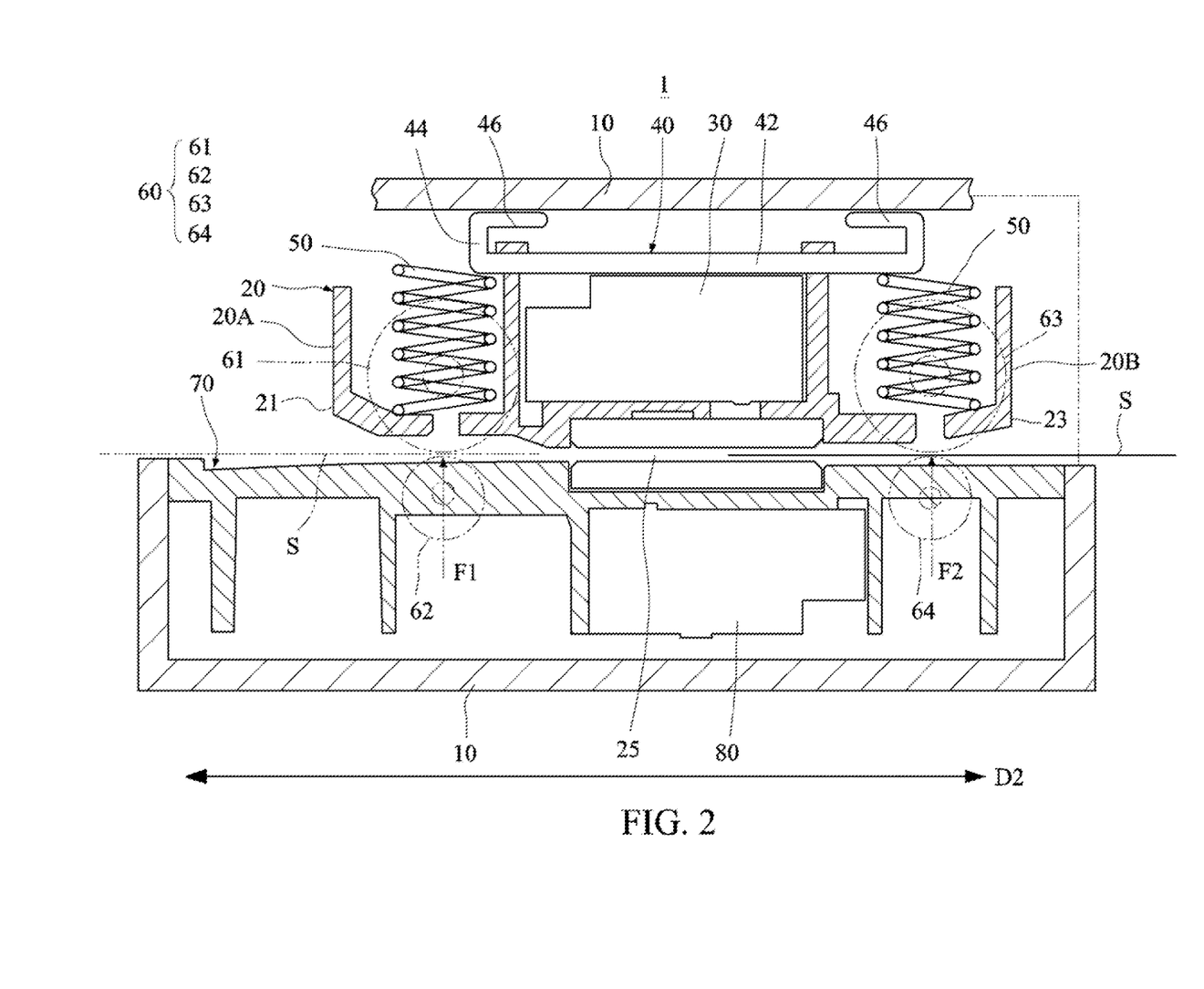
Figure 3:
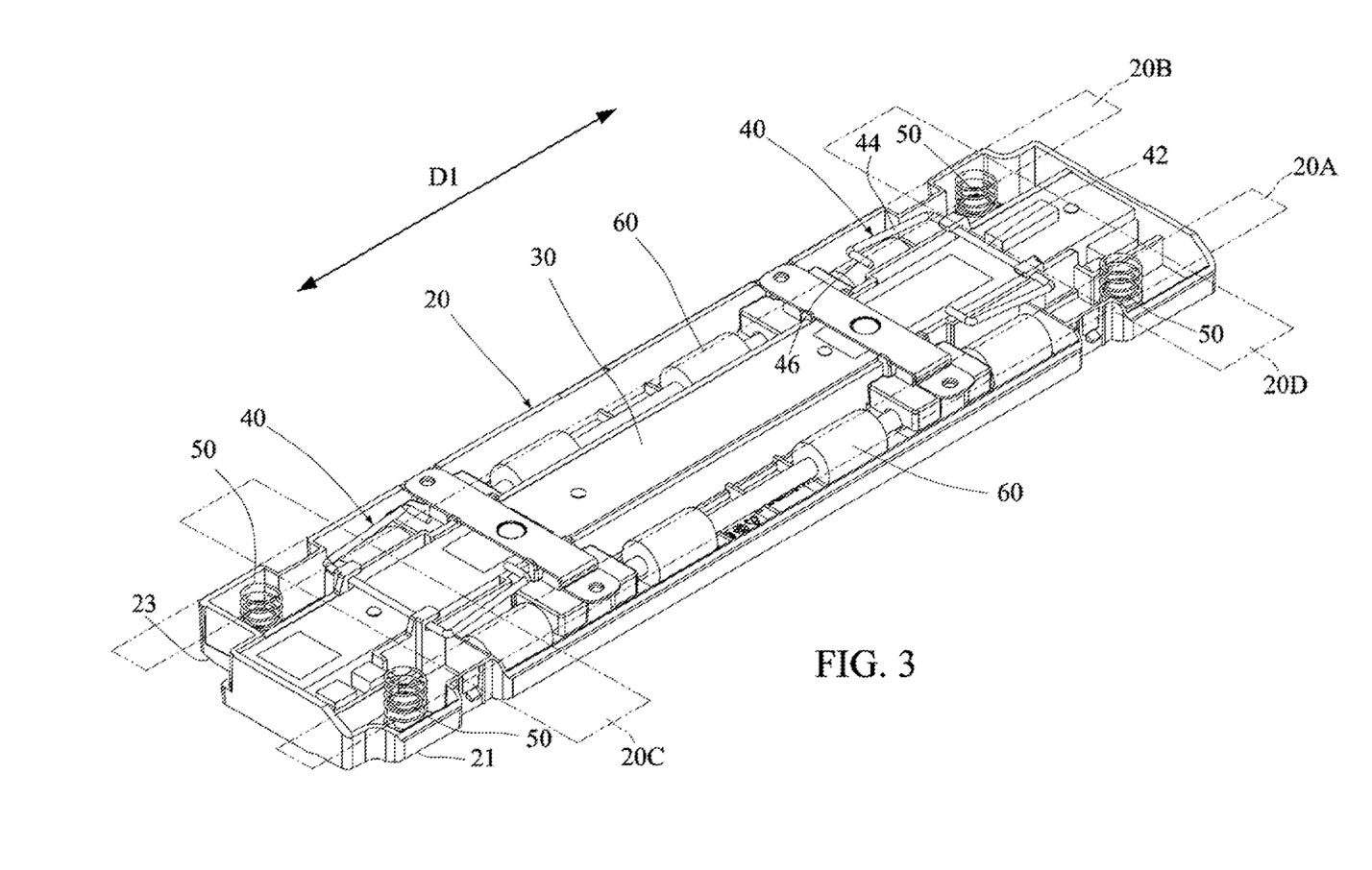
FIG. 3 is a partial pictorial view of the sheet-fed scanner according to the preferred embodiment of the present invention.
Figure 4:
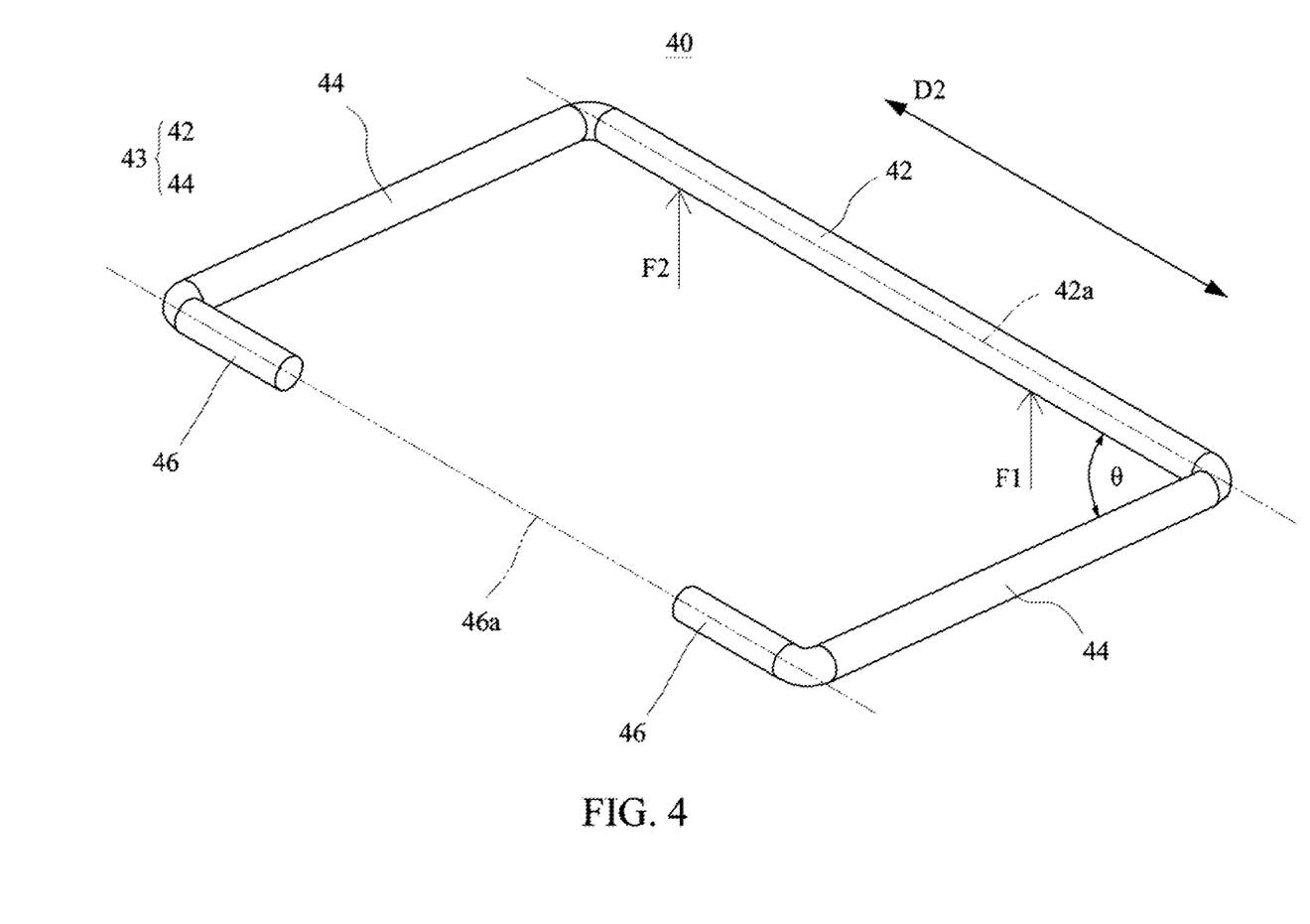
FIG. 4 is a pictorial view of a bent linking member according to the preferred embodiment of the present invention.

FIG. 1A is a pictorial view of a sheet-fed scanner 1 according to a preferred embodiment of the present invention. FIGS. 1B and 2 are respectively front and side views of the sheet-fed scanner 1 according to the preferred embodiment of the present invention. FIG. 3 is a partial pictorial view of the sheet-fed scanner 1 according to the preferred embodiment of the present invention. FIG. 4 is a pictorial view of a bent linking member according to the preferred embodiment of the present invention. The sheet-fed scanner 1 of this embodiment may well be a mobile scanner or a card reader, and may also be applicable to a sheet-fed copier or multi-function device, or may be combined with a flatbed scanner, which can accommodate document sheets of various thicknesses. Referring to FIGS. 1A, 1B and 2, the sheet-fed scanner 1 includes a housing 10, a scan assembly carrier 20, a scan assembly 30 and a bent linking member 40.

The scan assembly carrier 20 is movably disposed in the housing 10. The scan assembly 30, mounted on the scan assembly carrier 20, scans a side S1 of an original sheet S in a main scan direction D1 as the original sheet S enters a sheet passageway 25 of the sheet-fed scanner 1. The scan assembly 30 may include a charge-coupled device (CCD) type image sensor or a contact type image sensor (CIS). In this case, the main scan direction D1 is parallel to a straight line, on which the photodiodes of the image sensor are arranged in array alignment. A transporting direction D2, in which the original sheet S is transported, is perpendicular to the main scan direction D1.

The bent linking member 40, disposed between the housing 10 and the scan assembly carrier 20, links the scan assembly carrier 20 to the housing 10, and provides the degrees of freedom for moving one of the scan assembly carrier 20 and the housing 10 relatively to the other. In this embodiment, the scan assembly carrier 20 and the housing 10 may be moved towards or away from each other. The bent linking member 40 includes a first section 42 and a second section 44. The first section 42 and the second section 44 constitute a U-shaped elastic frame 43, such as the elastic frame formed by curving a stainless steel wire. The second section 44 connects with the first section 42 and forms an angle θ, which may be equal to 90 degrees or range between 0 and 180 degrees, with the first section 42.

Specifically speaking, the first section 42 extends transversally in relation to the main scan direction D1 and interconnects two opposed ends 20A and 20B of the scan assembly carrier 20. Referring to FIG. 3, each of the first and second ends 20A and 20B corresponds to an area or a certain spatial range of the scan assembly carrier 20. As one of the two opposed ends 20A and 20B of the scan assembly carrier 20 is pushed towards the housing 10 in a direction, the bent linking member 40 urges the other end of the two opposed ends 20A and 20B of the scan assembly carrier 20 to move in the same direction. That is, referring to FIG. 2, if a force F1 is exerted on the end 20A to move the end 20A in the direction of the pointed arrow F1, the bent linking member 40 urges the end 20B to move in the same direction. If a force F2 is exerted on the end 20B in a direction of the pointed arrow F2, the bent linking member 40 urges the end 20A to move in the same direction. Either one of the forces F1 and F2 is exerted on the scan assembly carrier 20 when the original sheet S enters the sheet passageway 25 between an input port 21 and an output port 23. The input port 21 corresponds to the end 20A and the output port 23 corresponds to the end 20B. The details thereof will be described in the following.

Figure 9:
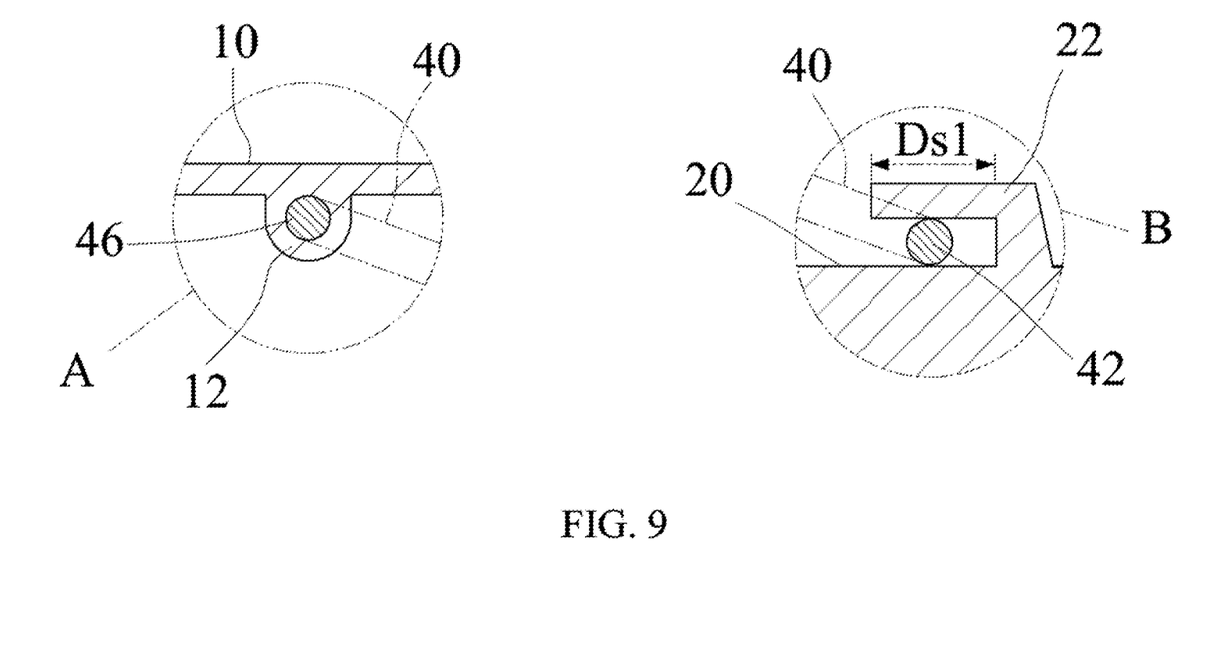
FIG. 9 is an enlarged partial view of blocks A and B of FIG. 1B according to a first example.

As shown in FIGS. 1B and 3, each of the bent linking members 40 is disposed closer to one of distal end portions 20C and 20D of the scan assembly carrier 20 with respect to the main scan direction D1. In another embodiment, only one bent linking member 40, disposed closer to the distal end portion 20C or 20D, is required. FIG. 9 is an enlarged partial view of blocks A and B of FIG. 1B according to a first example. As shown in FIGS. 1B, 2, 4 and 9, the bent linking member 40 further comprises a third section 46, connected with the second section 44. The third section 46 connects the U-shaped elastic frame 43 to the housing 10 at a pivoting point 12 on the housing 10. The U-shaped elastic frame 43 of the bent linking member 40 is rotatable about an axis 46a of the third section 46, as shown in FIG. 2. In this case, referring to FIG. 9, the first section 42 is attached to a position restrictor 22 of the scan assembly carrier 20, which allows the first section 42 to move within a specific distance Ds1 in the main scan direction D1 and restricts the rotatable angle of the U-shaped elastic frame 43. It is to be noted that the third section 46 may also be omitted without losing the effect of the present invention.

Figure 10:
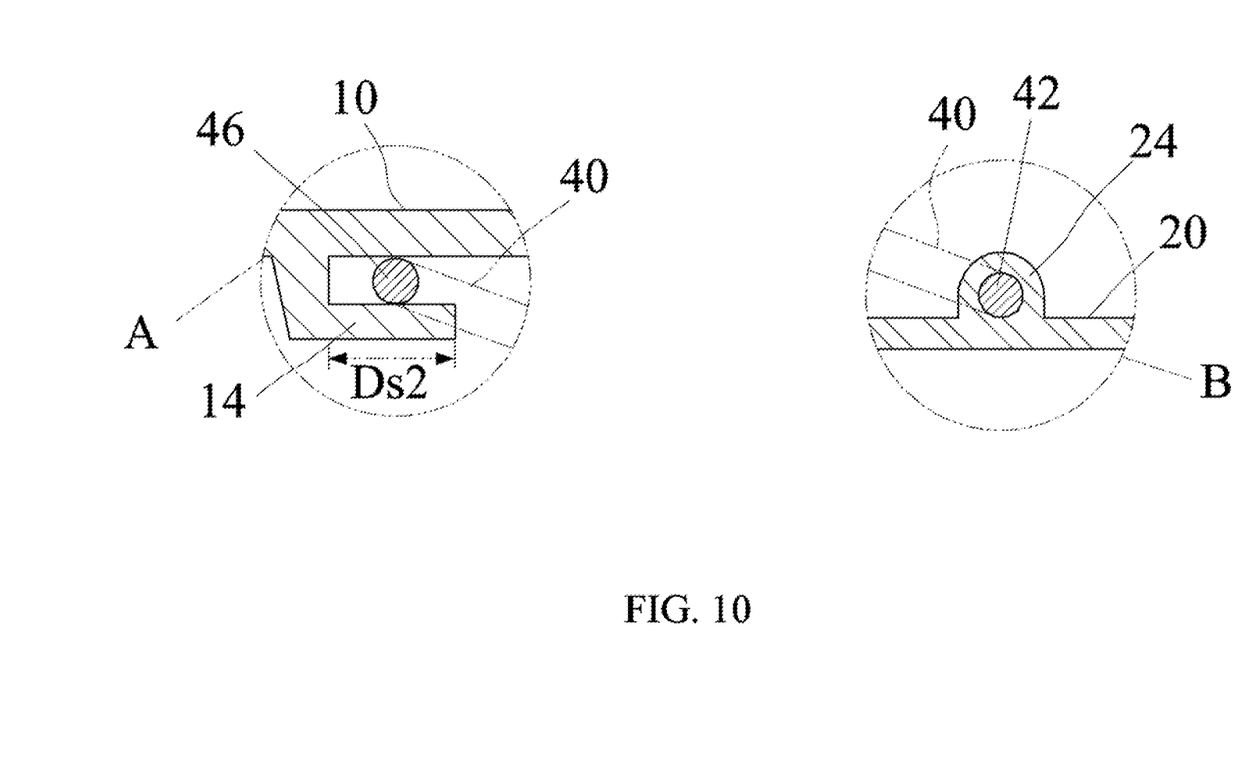
FIG. 10 is an enlarged partial view of blocks A and B of FIG. 1B according to a second example.

In addition, the bent linking member 40, the housing 10 and the scan assembly carrier 20 may also be connected together in another way. FIG. 10 is an enlarged partial view of blocks A and B of FIG. 1B according to a second example. As shown in FIGS. 4 and 10, the first section 42 is attached to a pivoting point 24 of the scan assembly carrier 20. The U-shaped elastic frame 43 is rotatable about an axis 42a of the first section 42. The third section 46, connecting the U-shaped elastic frame 43 to the housing 10, is attached to a position restrictor 14 of the housing 10, which allows the third section 46 to move within a specific distance Ds2 in the main scan direction D1 and restricts the rotatable angle of the U-shaped elastic frame 43. The connections of the bent linking member 40 to the housing 10 and the scan assembly carrier 20 in the blocks A and B are interchangeable. The connection of the bent linking member 40 in FIG. 3 pertains to the first example in FIG. 9.

In addition, as shown in FIG. 2, the sheet-fed scanner 1 further includes two elastic members 50, a sheet transporting mechanism 60, a second scan assembly carrier 70 and a second scan assembly 80.

The elastic members 50, such as compression springs, are respectively disposed on the ends 20A and 20B of the scan assembly carrier 20 to counteract the forces exerted on the scan assembly carrier 20. In this embodiment, as shown in FIG. 3, a set of the two elastic members 50 is disposed on the distal end portion 20C and another set of the two elastic members 50 is disposed on the other distal end portion 20D, for providing symmetrical restoring and acting forces to the scan assembly 30.

The sheet transporting mechanism 60, mounted on the scan assembly carrier 20, transports the original sheet S from one of the ends 20A and 20B to the other end. In this embodiment, as shown in FIGS. 2 and 3, the sheet transporting mechanism 60 includes rollers 61, 62, 63 and 64 for transporting the original sheet S from the end 20A to the end 20B.

The second scan assembly carrier 70 is disposed opposite the scan assembly carrier 20. The second scan assembly 80, mounted on the second scan assembly carrier 70, scans another side S2 of the original sheet S.

The schematic illustrations for the motions of the bent linking member in the sheet-feeding and discharging states will be described in the following.

Figure 5A:
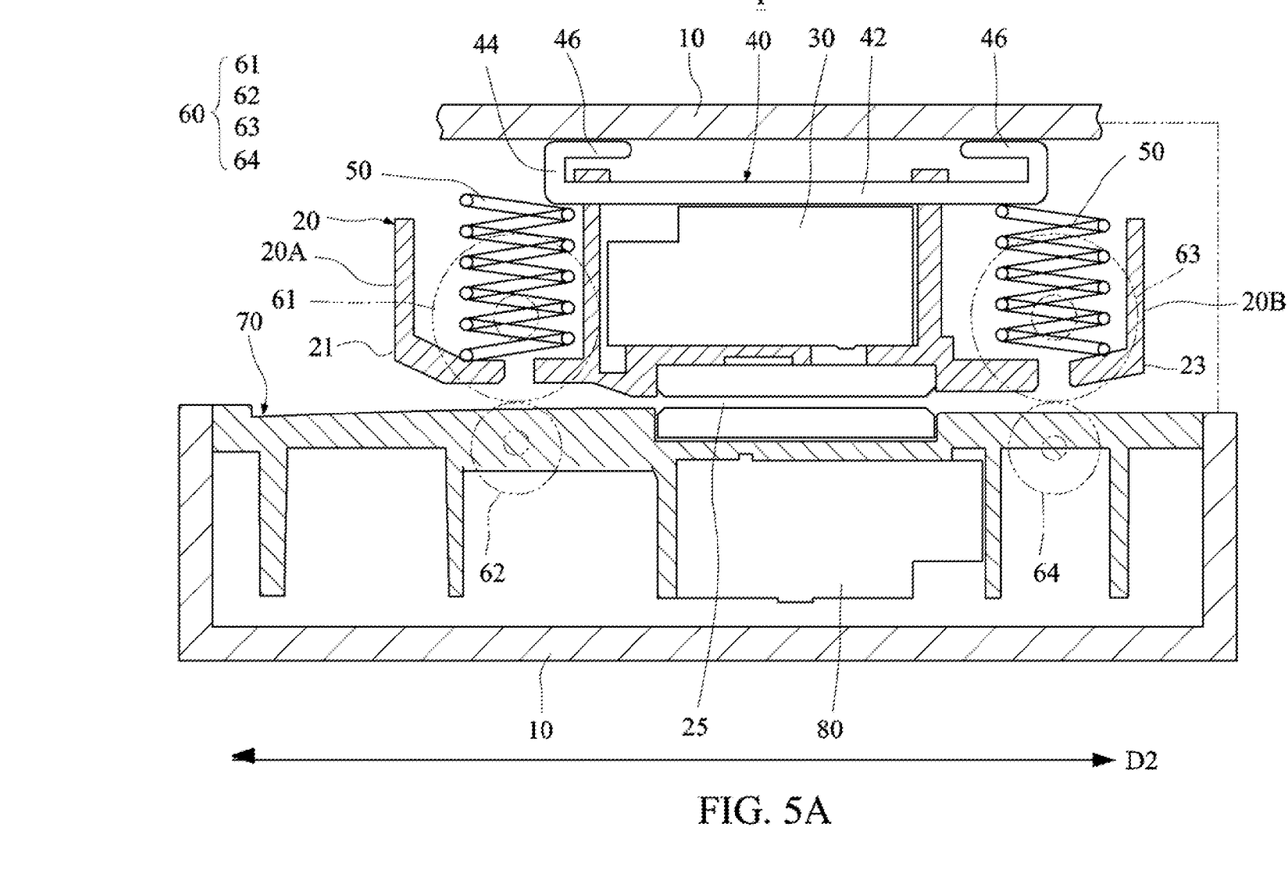
FIGS. 5A and 5B are respectively side and front views of the sheet-fed scanner of the present invention in the absence of the original sheet.
Figure 5B:
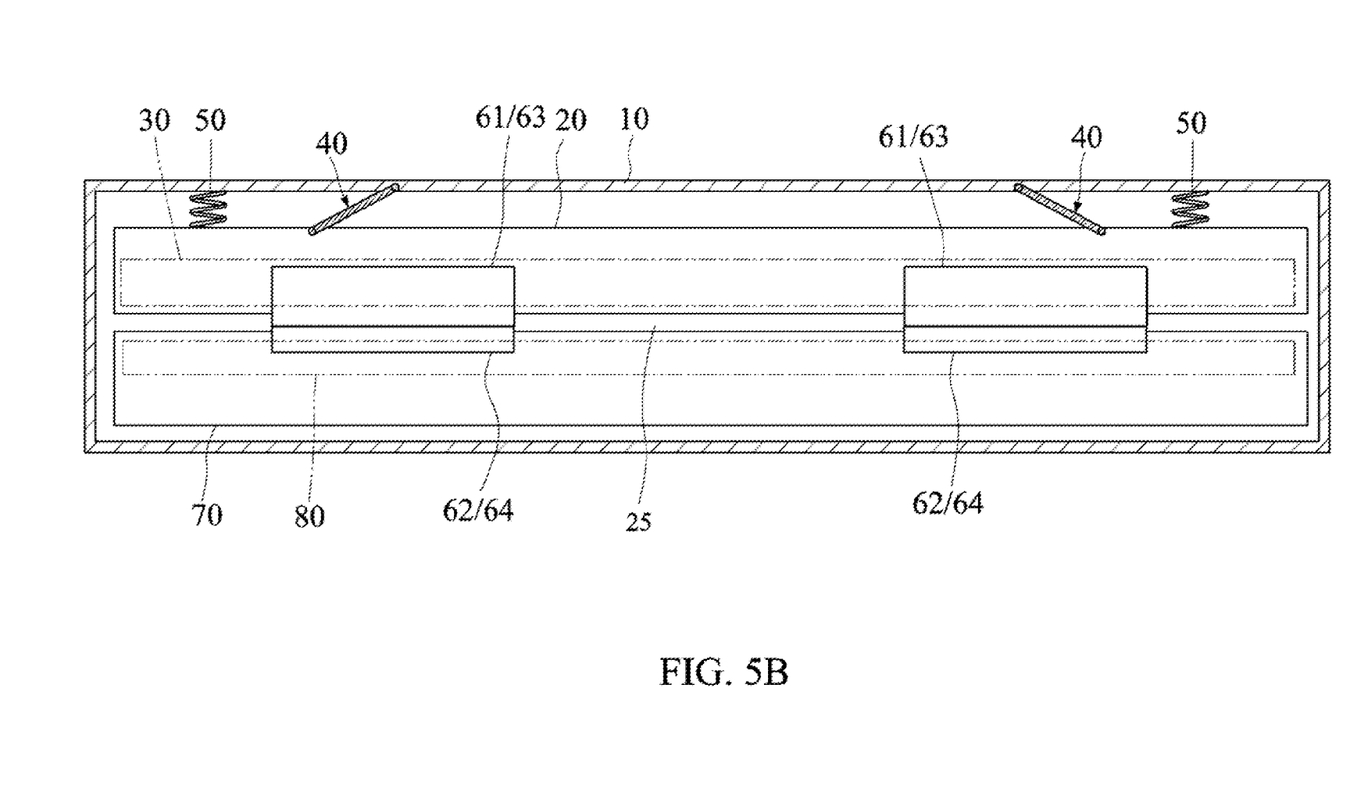

FIGS. 5A and 5B are respectively side and front views of the sheet-fed scanner of the present invention in the absence of the original sheet. As shown in FIGS. 5A and 5B, the scan assembly carrier 20 is located at a relatively low point.

Figure 6:
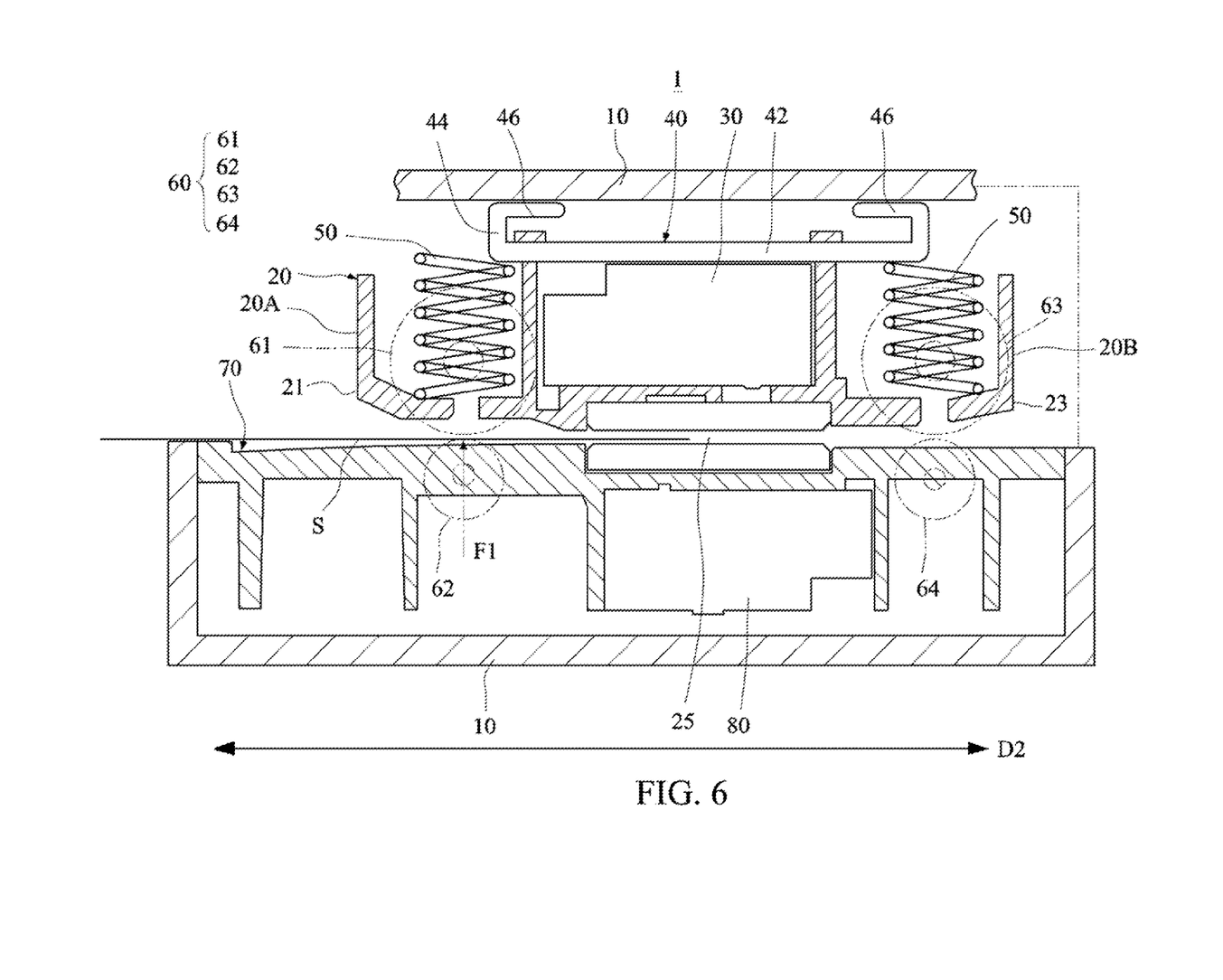
FIG. 6 is a side view of the sheet-fed scanner of the present invention in the sheet-feeding state.

FIG. 6 is a side view of the sheet-fed scanner of the present invention in the sheet-feeding state. As shown in FIG. 6, the original sheet S is present between the rollers 61 and 62, but has not yet reached the nip between the rollers 63 and 64, and the original sheet S with the specific thickness pushes the roller 61 upwards. The bent linking member 40 functions to lift up the entire scan assembly carrier 20 into a horizontal position. At this time, the scan assembly carrier 20 is located at a relatively high point. In this embodiment, when the original sheet S enters the sheet passageway 25 from the input port 21, the original sheet S passing through the rollers 61 and 62 exerts an upward force F1 on the end 20A, so that the end 20A of the scan assembly carrier 20 is moved upwards and towards the housing 20. The end 20B of the scan assembly carrier 20 is also moved upwards under the linking action of the bent linking member 40.

Figure 7A:
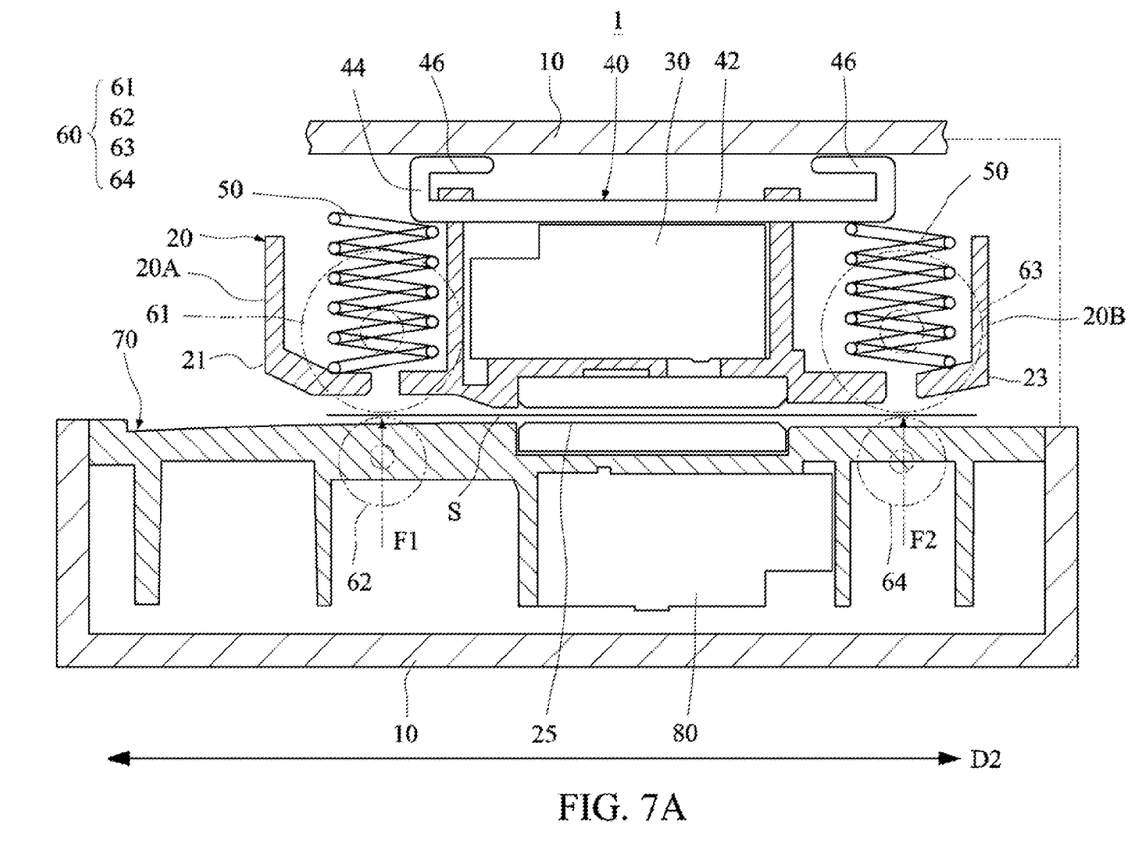
FIGS. 7A and 7B are respectively side and front views of the sheet-fed scanner of the present invention in the presence of the original sheet.
Figure 7B:
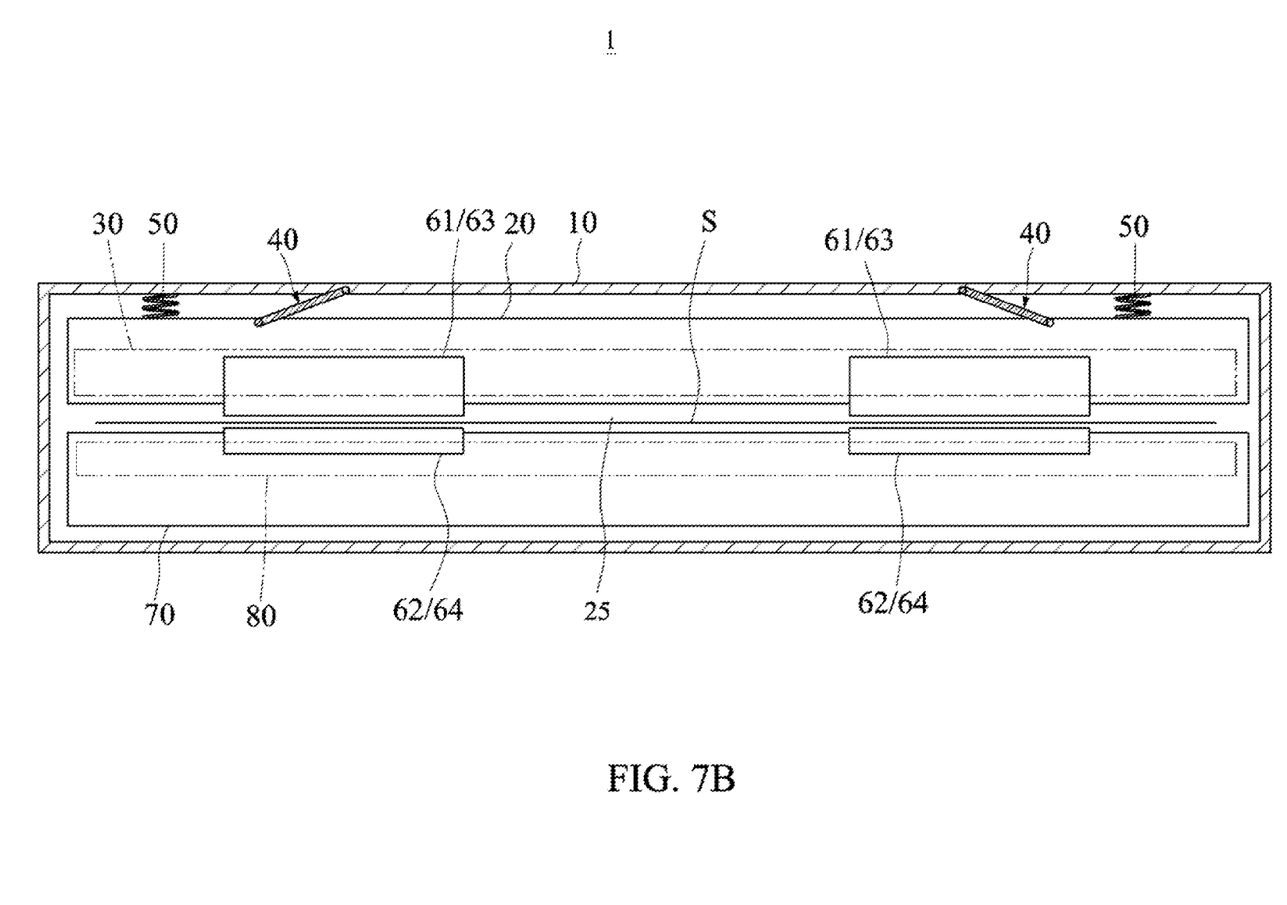

FIGS. 7A and 7B are respectively side and front views of the sheet-fed scanner of the present invention in the presence of the original sheet. As shown in FIGS. 7A and 7B, the original sheet S is passing through the nips between the rollers 61 and 62 and the rollers 63 and 64, and the original sheet S with the specific thickness pushes the roller 61 and 63 upwards by the forces F1 and F2, so that the entire scan assembly carrier 20 is lifted up into the horizontal position. At this time, the scan assembly carrier 20 is located at the relatively high point.

Figure 8:
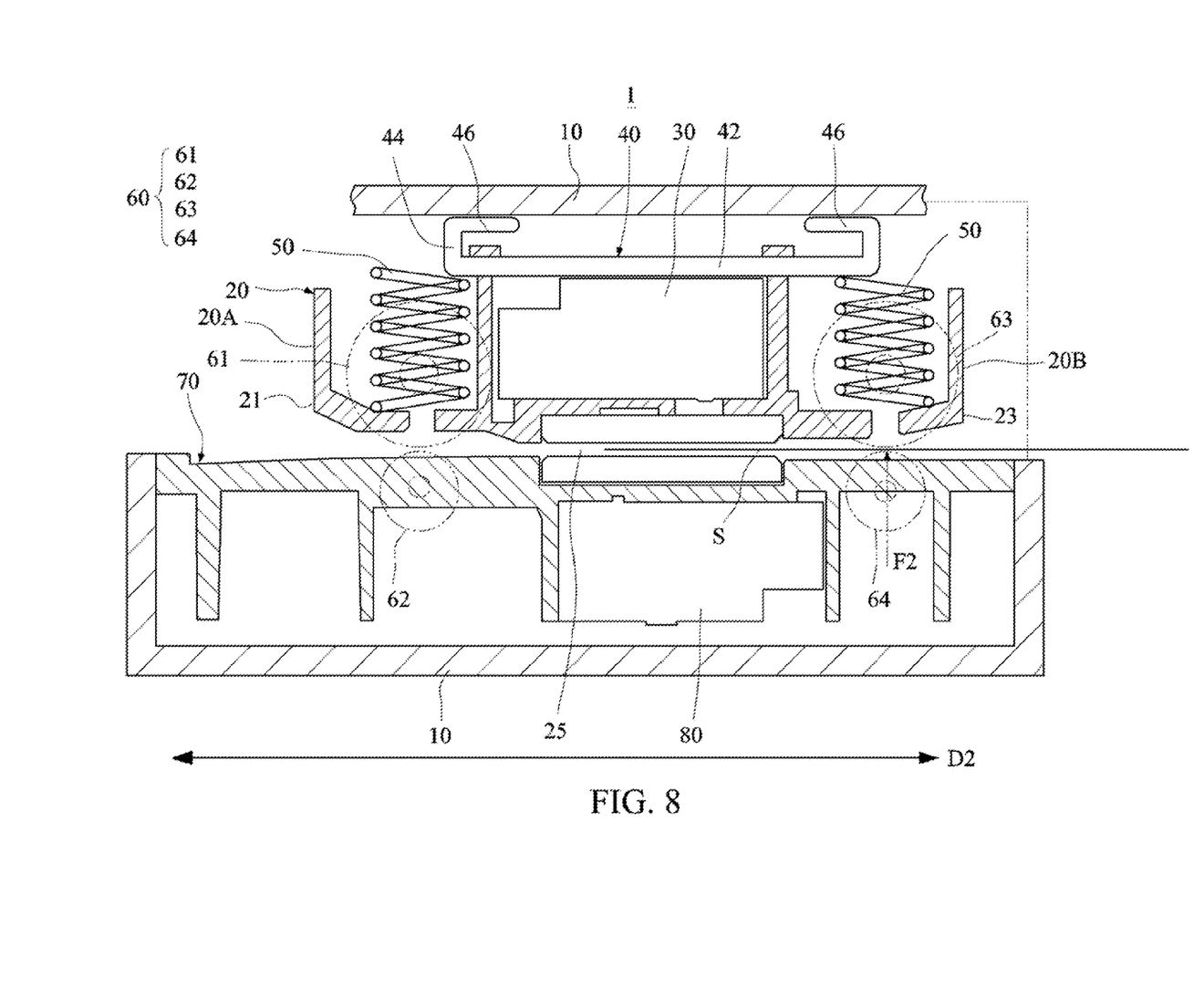
FIG. 8 is a side view of the sheet-fed scanner of the present invention in the sheet-discharging state.

FIG. 8 is a side view of the sheet-fed scanner of the present invention in the sheet-discharging state. As shown in FIG. 8, the original sheet S has left the nip between the rollers 61 and 62, but is still passing through the nip between the rollers 63 and 64. The original sheet S leaving the nip between the rollers 61 and 62 tends to make the roller 61 fall down, but the entire scan assembly carrier 20 is still kept at the lifted horizontal state due to the action of the bent linking member 40. At this time, the scan assembly carrier 20 is still located at the relatively high point. When the original sheet S leaves the nip between the rollers 61 and 62, the original sheet S is still transported forward by the rollers 63 and 64, and the original sheet S exerts an upward force F2 on the second end 20B. The first end 20A of the scan assembly carrier 20 is still kept at the original high point under the linking action of the bent linking member 40. That is, no sudden fall of the scan assembly 30 will occur to create image shock when the original sheet S leaves the nip between the rollers 61 and 62.

Finally, when the original sheet S is completely discharged out of the nips between the rollers 61 and 62 and the rollers 63 and 64, the sheet-fed scanner 1 returns to the state of FIG. 5.

Therefore, the sheet-fed scanner 1 of the present invention can restore the scan assembly carrier 20 to the level state by utilizing the rigidity and the elasticity of the bent linking member 40. The present invention effectively prevents the conventional seesaw effect and reduces the shock caused when the original sheet S is transported past the rollers, and thus the scan image quality is improved.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A sheet-fed scanner, comprising:
   a housing;
   a scan assembly carrier movably disposed in the housing;
   a scan assembly, mounted in the scan assembly carrier, for scanning a side of an original sheet in a main scan direction as the original sheet enters a sheet passageway of the sheet-fed scanner; and
   a bent linking member disposed between the housing and the scan assembly carrier, the bent linking member comprising:
      a first section extending transversally in relation to the main scan direction and interconnecting two opposed ends of the scan assembly carrier; and
      a second section connected with the first section and forming an angle with the first section,
   wherein as one of the two opposed ends of the scan assembly carrier is pushed towards the housing by the original sheet entering the sheet passageway, the bent linking member urges the other end of the two opposed ends to move correspondingly towards the housing to keep the scan assembly carrier at a horizontal state.

2. The sheet-fed scanner according to claim 1, wherein the bent linking member comprises a U-shaped elastic frame, and the first section and the second section constitute the U-shaped elastic frame.

3. The sheet-fed scanner according to claim 2, wherein the bent linking member further comprises a third section connecting the U-shaped elastic frame to the housing at a pivoting point, wherein the U-shaped elastic frame is rotatable about an axis of the third section.

4. The sheet-fed scanner according to claim 3, wherein the first section is attached to a position restrictor of the scan assembly carrier, which allows the first section to move within a specific distance in the main scan direction and restricts a rotatable angle of the U-shaped elastic frame.

5. The sheet-fed scanner according to claim 2, wherein the first section is attached to a pivoting point of the scan assembly carrier, wherein the U-shaped elastic frame is rotatable about an axis of the first section.

6. The sheet-fed scanner according to claim 5, wherein the bent linking member further comprises a third section connecting the U-shaped elastic frame to the housing, wherein the third section is attached to a position restrictor of the housing, which allows the third section to move within a specific distance in the main scan direction and restricts a rotatable angle of the U-shaped elastic frame.

7. The sheet-fed scanner according to claim 1, further comprising:
   two elastic members, respectively disposed on the two opposed ends of the scan assembly carrier, for counteracting a force exerted on the scan assembly carrier.

8. The sheet-fed scanner according to claim 1, further comprising:
   a sheet transporting mechanism, mounted on the scan assembly carrier, for transporting the original sheet from one of the two opposed ends of the scan assembly carrier to the other end of the two opposed ends.

9. The sheet-fed scanner according to claim 1, further comprising:
   a second scan assembly carrier disposed opposite the scan assembly carrier; and
   a second scan assembly, mounted on the second scan assembly carrier, for scanning another side of the original sheet.

10. The sheet-fed scanner according to claim 1, wherein the bent linking member is disposed closer to a distal end portion of the scan assembly carrier with respect to the main scan direction.

11. The sheet-fed scanner according to claim 10, further comprising a second bent linking member disposed closer to another distal end portion of the scan assembly carrier with respect to the main scan direction.

* * * * *